W. R. THOMSON.
Car Wheel.

No. 15,092.    Patented June 10, 1856.

UNITED STATES PATENT OFFICE.

WILLIAM R. THOMSON, OF CLEVELAND, OHIO.

CONSTRUCTING RAILWAY-CAR WHEELS.

Specification of Letters Patent No. 15,092, dated June 10, 1856.

*To all whom it may concern:*

Be it known that I, WILLIAM R. THOMSON, of Cleveland, in the county of Cuyahoga and State of Ohio, have invented a new and useful Improvement in the Construction of Wrought-Iron Car and Locomotive Wheels; and I do hereby declare that the following is a full, clear, and exact description of the same, reference being had to the annexed drawings, making a part of this specification, in which—

Figure 1:
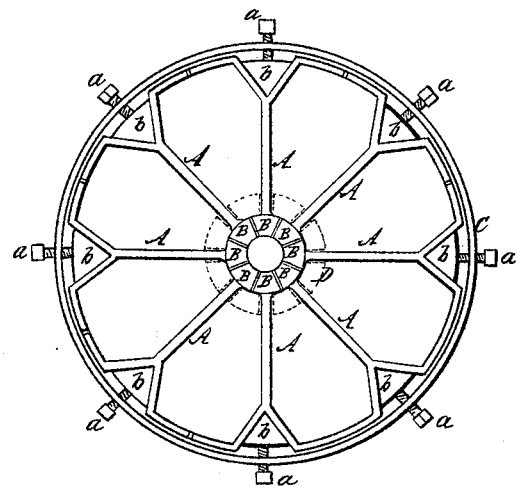
Figure 2:
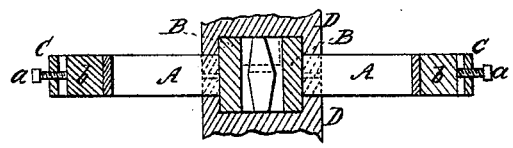
Figure 3:
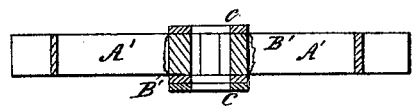
Figures 4, 5:
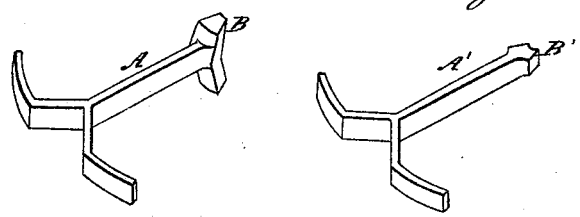

Figure 1, is a side or face view of my improved car wheel, the parts not being welded together, nor the rim or tread attached. Fig. 2, is a section of ditto, the plane of section passing through the center, longitudinally with its axis. Fig. 3, is a section of a wheel as usually constructed, showing the difference between my improvement, and the old plan or mode of construction. Fig. 4, is a detached view of a spoke and butt of my improved wheel. Fig. 5, is a detached view of a spoke and butt of the old wheel.

Similar letters of reference indicate corresponding parts in the several figures.

My invention consists in a peculiar manner of forming the butts of the spokes, which butts when welded together form the hub of the wheel, whereby a solid, durable, and perfect hub is obtained.

To enable others skilled in the art to fully understand and construct my invention, I will proceed to describe it.

A, represents the spokes of my improved wheel, which are forged separately, and may be of any desired form.

B, represents the butts of the spokes. These butts are forged with the spokes, a butt being at the inner end of each spoke. The butts are sections of the hub of the wheel, and when the spokes are properly arranged, the butts adjoin each other, and form when welded together the hub of the wheel. This will be understood by referring to Fig. 1. The sides of the butts B, are of course radial from a point which is at the center of the hub, but the sides of the butts are not parallel, they are inclined as shown in Figs. 2, and 4, so that when the butts are fitted together they will be dovetailed, and the butts consequently prevented from sliding apart laterally or longitudinally with the hub. The butts are welded together as follows, the spokes A, are properly arranged, the butts B, being fitted together, and a band or hoop C, is placed around the ends of the spokes, and secured in proper position by set screws (*a*) which pass into angular blocks (*b*) placed in the forks of the arms. The band or hoop C, holds the spokes and butts together, and in proper position. The butts are then heated to a welding heat and welded together, or swaged by dies D, D, shown in red, Figs. 1 and 2. In consequence of the sides of the butts being inclined, they may be welded perfectly together, and a solid, durable, and perfect hub is obtained. In the usual mode of construction, the sides of the butts are parallel, and the butts do not exceed in length the width of the spokes, see Figs. 3, and 5, in which A', represents the spokes, and B', the butts. The hub is completed by welding washers or rings (*c*) on the ends of the butts. In consequence of the parallel sides of the butts, they cannot be perfectly welded together, the ends are united perfectly, but they are liable to spread apart at the centers, as shown in Fig. 3. By my improvement the butts are dovetailed together and perfectly welded, they have no opportunity of spreading at the centers, but unite more readily in consequence of the inclined sides. Instead of the butts B, being formed with inclined sides, as shown in Fig. 4, they may be of curved or zig-zag form, in fact any form may be given to the sides of the butts, so that a dovetail or lock will be obtained to prevent the butts from slipping or sliding laterally. The above improvement may possibly be advantageously employed in constructing the hubs of propeller wheels.

I do not claim forming the hubs of car wheels in sections, and welding said sections together, irrespective of the peculiar form of the sides of said sections or butts as herein described.

What I claim therefore as new, and desire to secure by Letters Patent, is—

Having the butts made the entire length of the hub, and the sides of the butts inclined, curved, or made in zig-zag form, so that they form when placed together dovetail joints, for the purpose of preventing any lateral movement of the butts, and to insure the perfect welding of the same at all points of contact, whereby a solid and perfect hub is obtained.

WILLIAM R. THOMSON.

Witnesses:
AUSTIN M. CASE,
THOMAS MAGEE.